Figure 1A:
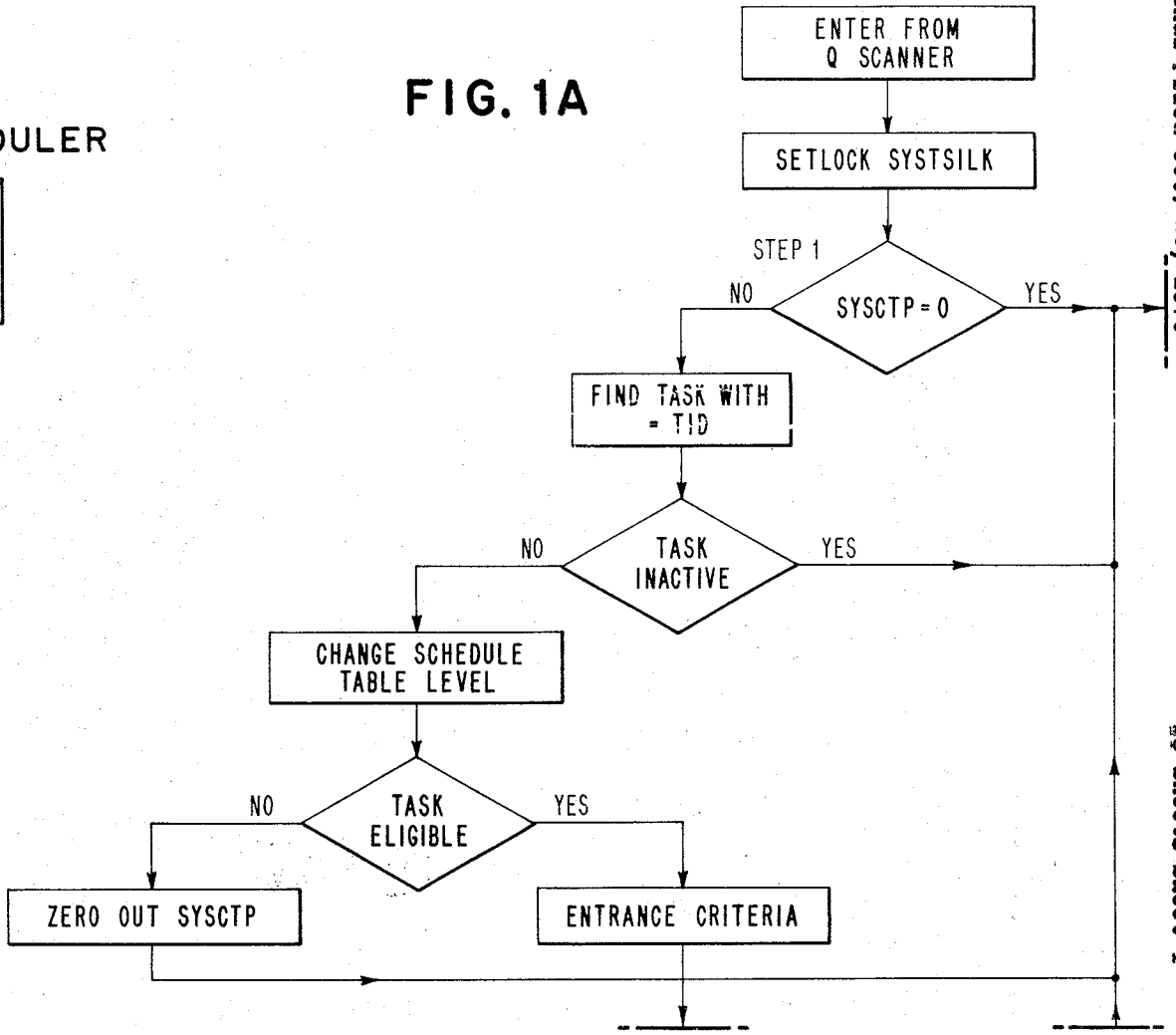
Figure 1:
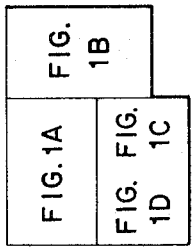
Figure 1B:
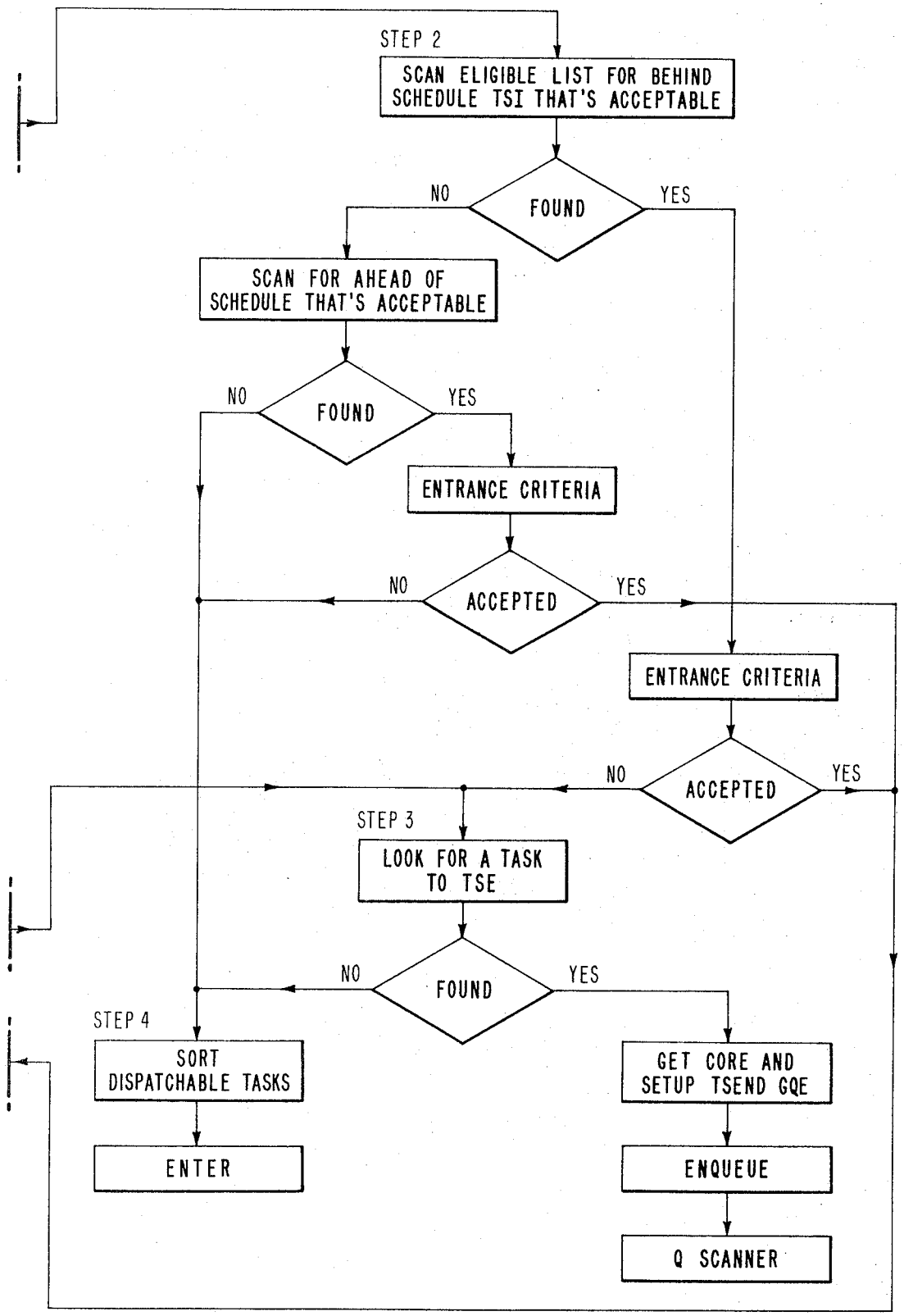
Figure 1C:
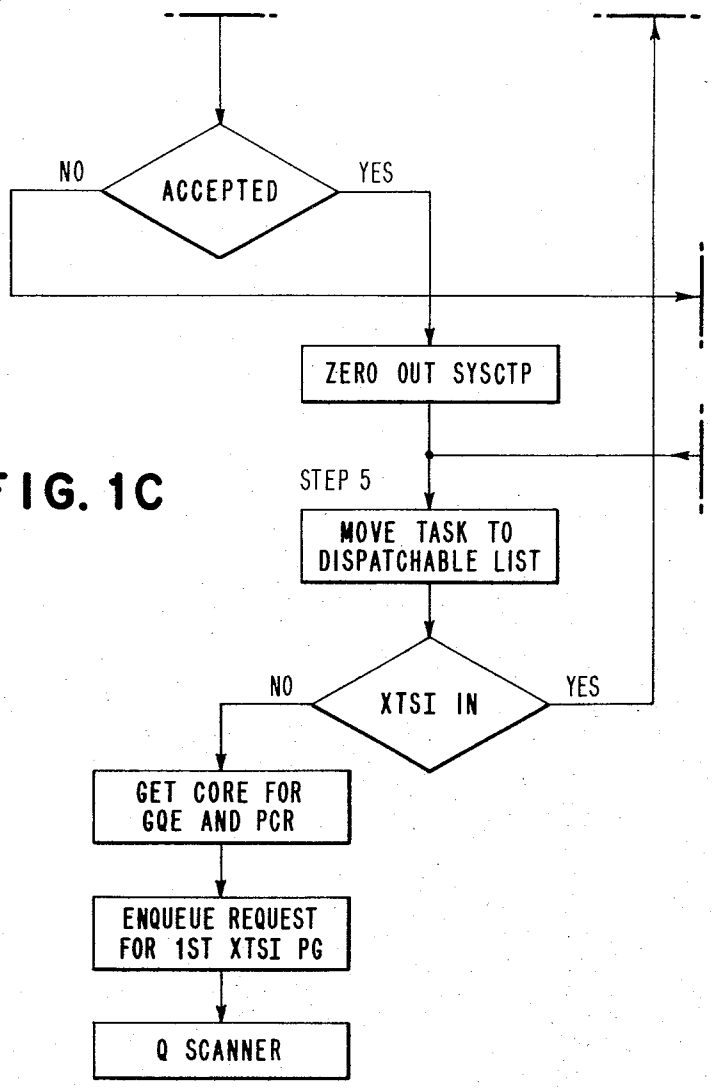
Figure 1D:
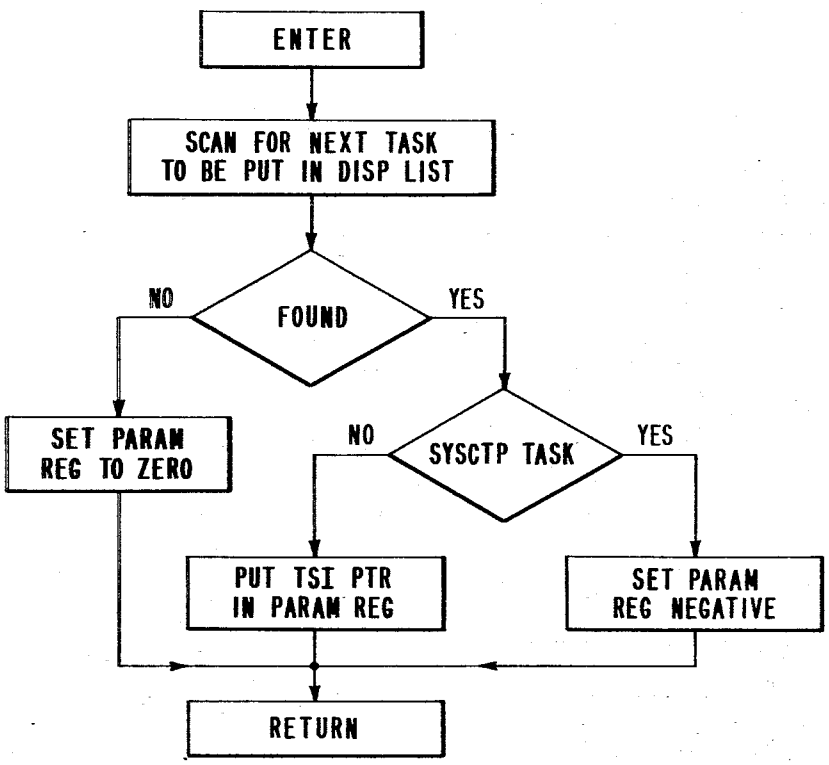
Figures 2, 2A:
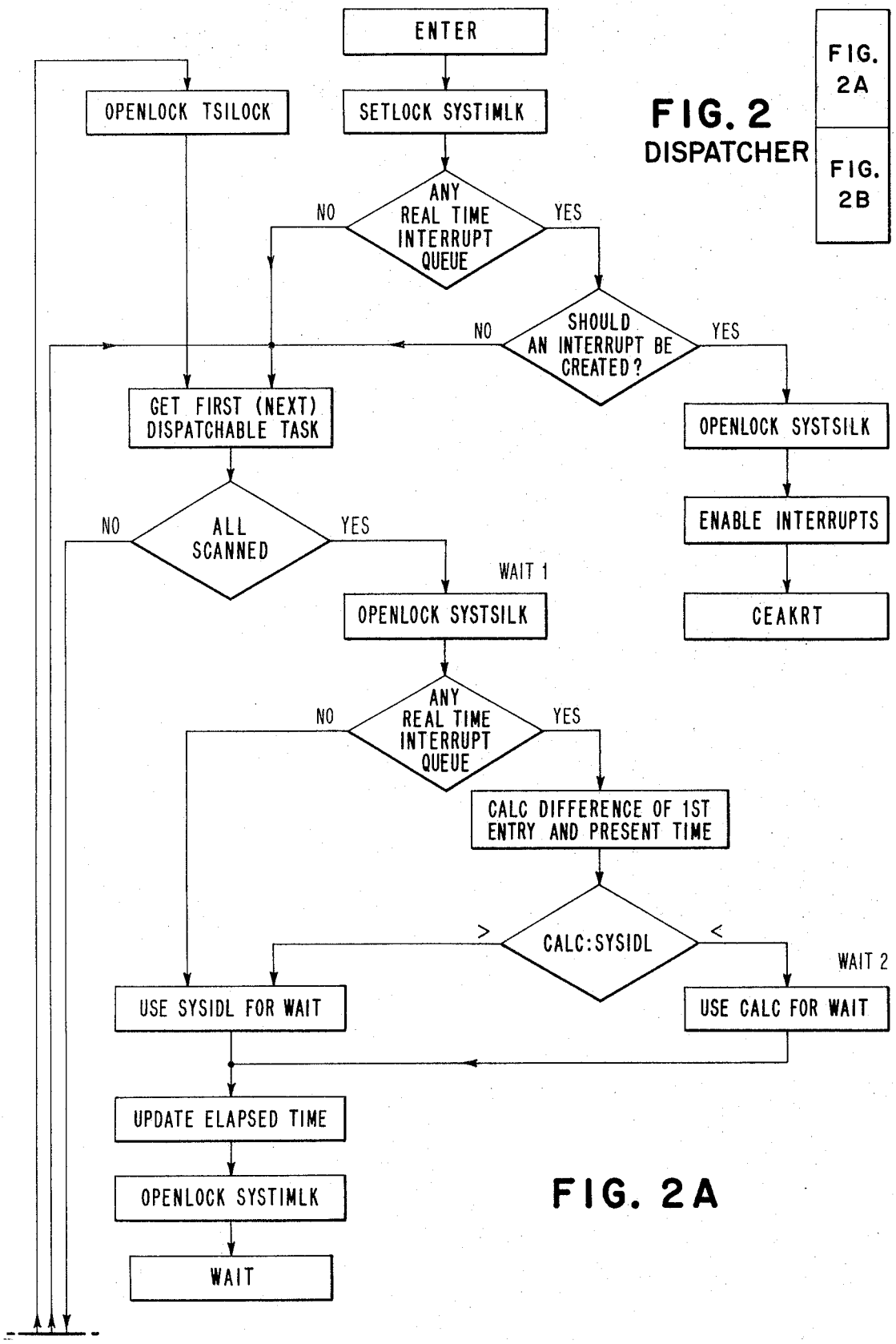
Figure 2B:
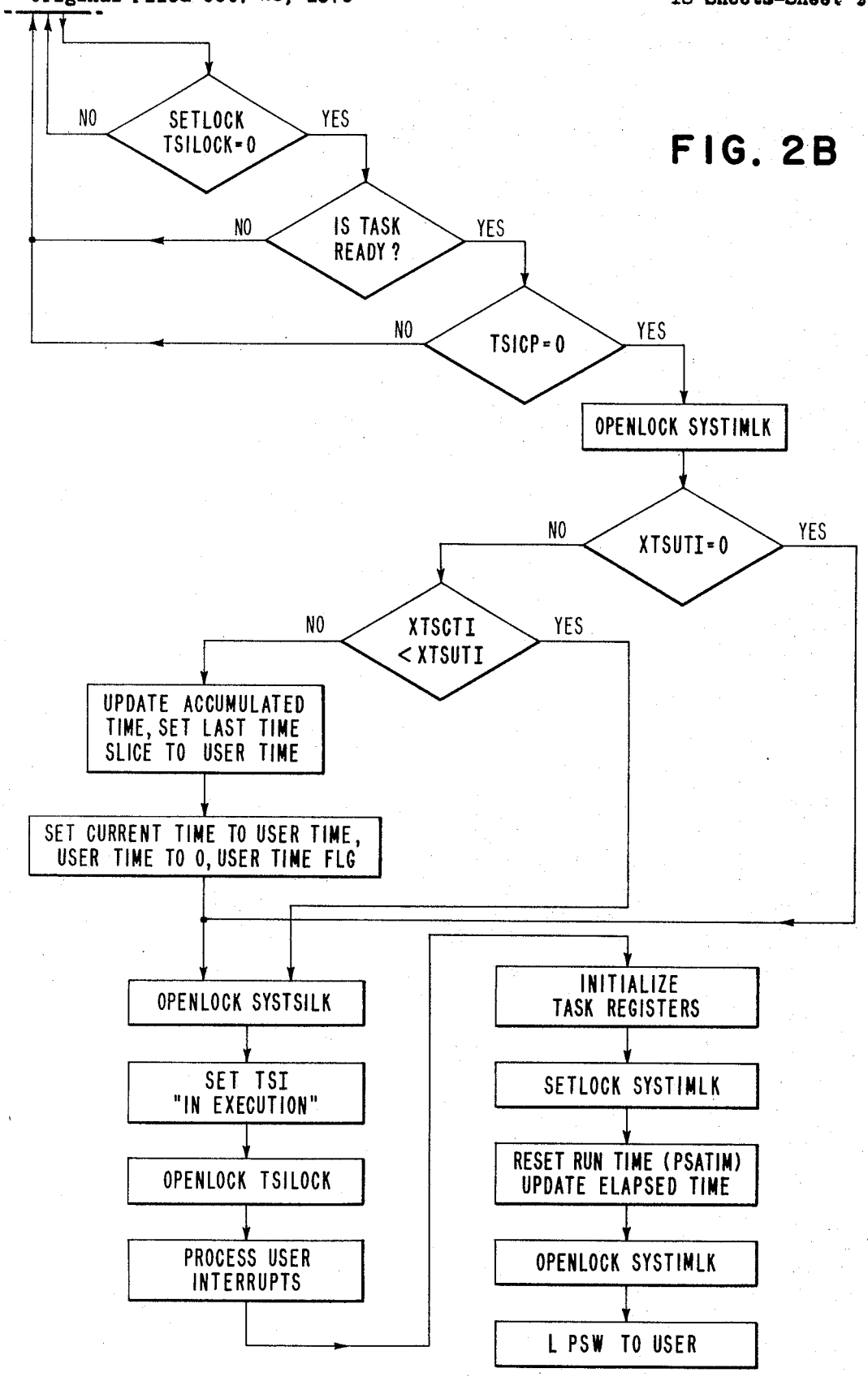
Figures 3, 3A:
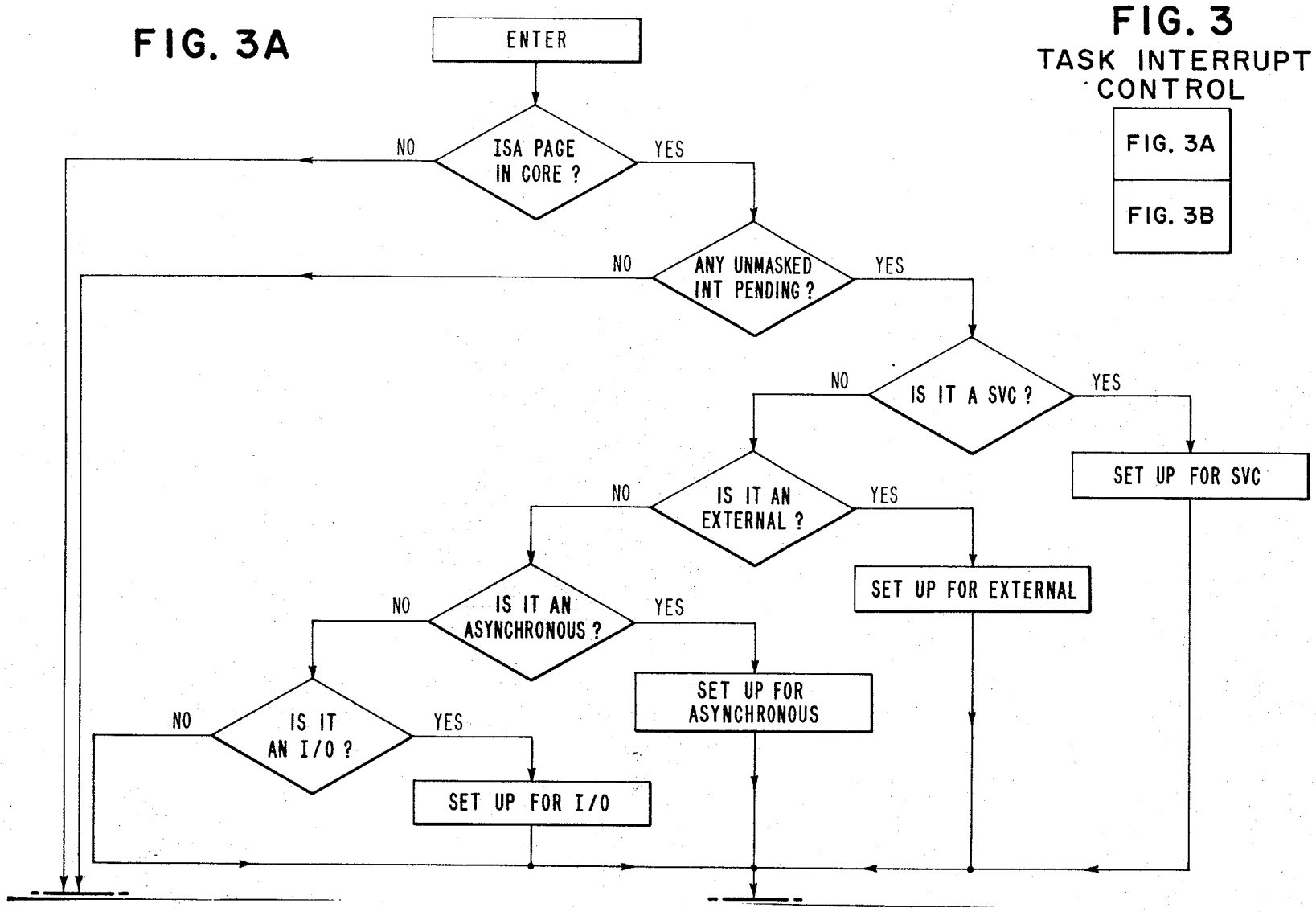
Figure 3B:
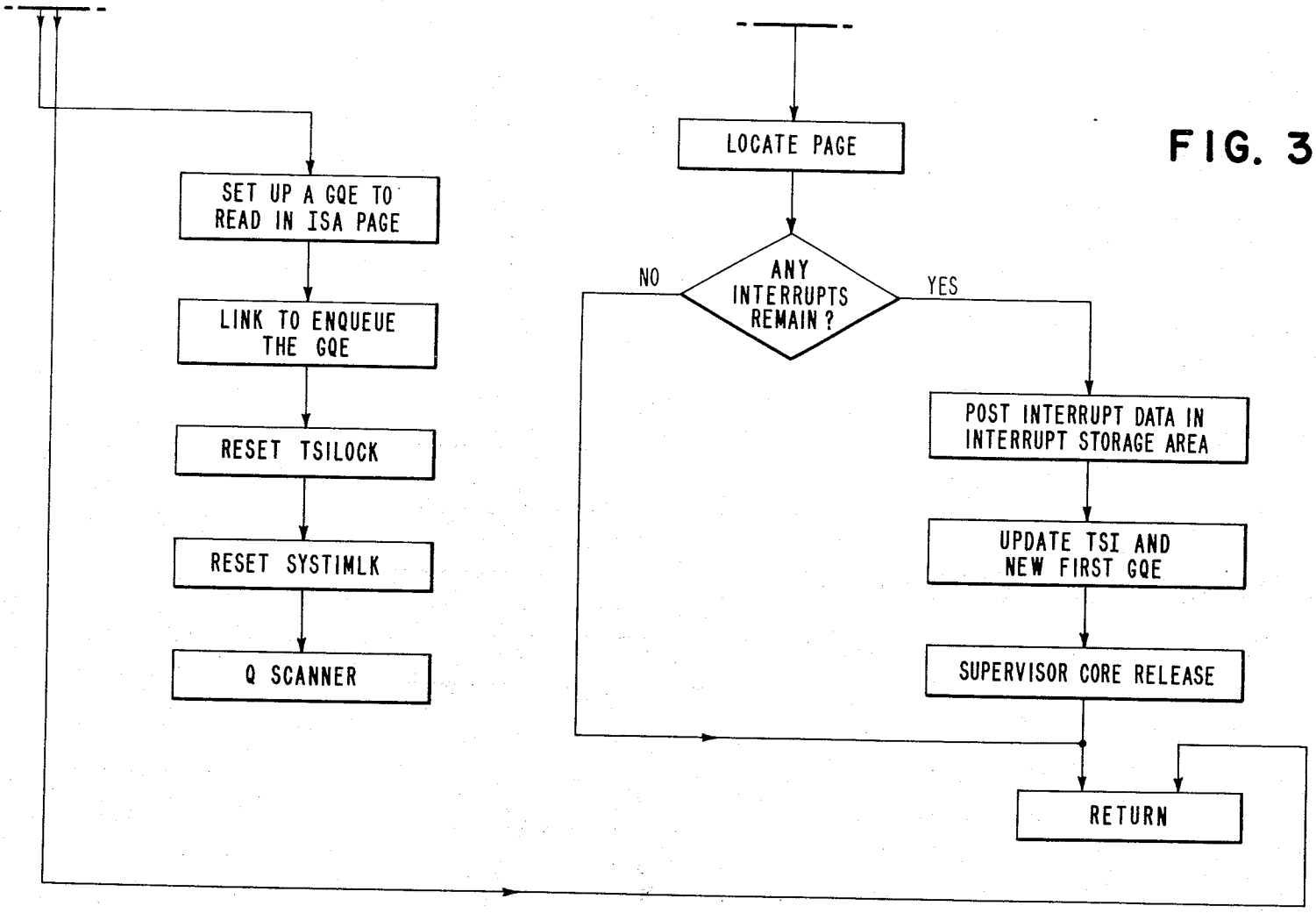
Figure 4:
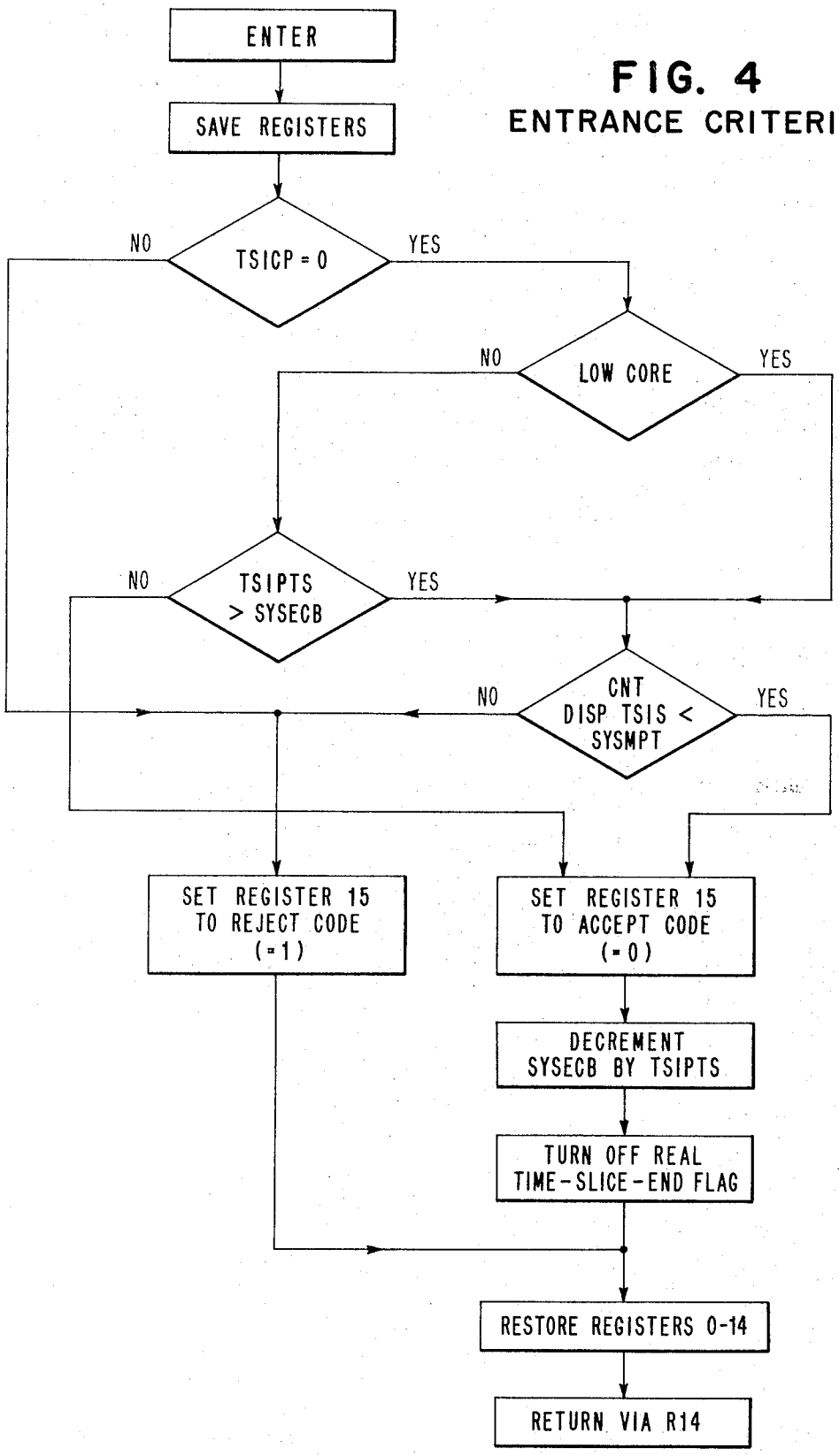

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 3, 1974

926 O.G. 10

T926,007

METHOD OF SCHEDULING IN A DATA PROCESSING SYSTEM

Walter J. Doherty, Mahopac, N.Y., assignor to International Business Machines Corporation, Armonk, N.Y.

Continuation of application Ser. No. 83,394, Oct. 23, 1970. This application Sept. 17, 1973, Ser. No. 398,608

**Int. Cl. G06f *9/12***

U.S. Cl. 444—1

18 Sheets Drawing. 46 Pages Specification

| | | LEVEL | PRIOR | TSVAL | QUANT | MAXCRD | PULSE | AWTEX | DELTA | TSEND | HPRE | TWAIT | AWAIT | PCRWMPT | MRQ | HLCK | LCHL | WLCK | PRJ1 | PRJ2 | PRJ3 | PRJ4 |
|---|---|---|---|---|---|---|---|---|---|---|---|---|---|---|---|---|---|---|---|---|---|---|
| STARTING SET | SYSOPERO | 00 | 05 | 0026 | 01 | 20 | FF | 00 | 0000 | 00 | 00 | 00 | 00 | 00 | 0A | 16 | 16 | 23 | 00 | 00 | 00 | 00 |
| | INTERACTIVE | 01 | 18 | 0010 | 01 | 10 | FF | 01 | 0000 | 00 | 47 | 51 | 30 | 08 | 80 | 0A | 17 | 17 | 24 | 1F | 1F | 1F |
| | INTERACTIVE | 02 | 18 | 0010 | 01 | 10 | FF | 02 | 0000 | 00 | 47 | 51 | 30 | 08 | 80 | 0A | 17 | 17 | 24 | 1F | 1F | 1F |
| | INTERACTIVE | 03 | 18 | 0010 | 01 | 10 | FF | 03 | 0000 | 00 | 47 | 51 | 30 | 08 | 80 | 0A | 17 | 17 | 24 | 1F | 1F | 1F |
| | INTERACTIVE | 04 | 18 | 0010 | 01 | 10 | FF | 04 | 0000 | 00 | 47 | 51 | 30 | 08 | 80 | 0A | 17 | 17 | 24 | 1F | 1F | 1F |
| | INTERACTIVE | 05 | 18 | 0010 | 01 | 10 | FF | 05 | 0000 | 00 | 47 | 51 | 30 | 08 | 80 | 0A | 17 | 17 | 24 | 1F | 1F | 1F |
| | INTERACTIVE | 06 | 18 | 0010 | 01 | 10 | FF | 06 | 0000 | 00 | 47 | 51 | 30 | 08 | 80 | 0A | 17 | 17 | 24 | 1F | 1F | 1F |
| | INTERACTIVE | 07 | 18 | 0010 | 01 | 10 | FF | 07 | 0000 | 00 | 47 | 51 | 30 | 08 | 80 | 0A | 17 | 17 | 24 | 1F | 1F | 1F |
| | INTERACTIVE | 08 | 18 | 0010 | 01 | 10 | FF | 08 | 0000 | 00 | 47 | 51 | 30 | 08 | 80 | 0A | 17 | 17 | 24 | 1F | 1F | 1F |
| | INTERACTIVE | 09 | 18 | 0010 | 01 | 10 | FF | 09 | 0000 | 00 | 47 | 51 | 30 | 08 | 80 | 0A | 17 | 17 | 24 | 1F | 1F | 1F |
| | BULK I/O | 0A | 04 | 0026 | 01 | 20 | FF | 0A | 0000 | 00 | 0A | 0A | 0A | 00 | 01 | 1A | 1A | 22 | 0A | 0A | 0A | 0A |
| | BATCH | 0B | 10 | 0013 | 01 | 10 | FF | 0B | 012F | 01 | 4C | 35 | 35 | 0B | 80 | 0A | 1B | 1B | 27 | 0B | 0B | 0B |
| | BATCH | 0C | 10 | 0013 | 01 | 10 | FF | 0C | 012F | 01 | 4C | 35 | 35 | 0C | 80 | 0A | 1B | 1B | 27 | 0C | 0C | 0C |
| | BATCH | 0D | 10 | 0013 | 01 | 10 | FF | 0D | 012F | 01 | 4C | 35 | 35 | 0D | 80 | 0A | 1B | 1B | 27 | 0D | 0D | 0D |
| | BATCH | 0E | 10 | 0013 | 01 | 10 | FF | 0E | 012F | 01 | 4C | 35 | 35 | 0E | 80 | 0A | 1B | 1B | 27 | 0E | 0E | 0E |
| | BATCH | 0F | 10 | 0013 | 01 | 10 | FF | 0F | 012F | 01 | 4C | 35 | 35 | 0F | 80 | 0A | 1B | 1B | 27 | 0F | 0F | 0F |
| | BATCH | 10 | 10 | 0013 | 01 | 10 | FF | 10 | 012F | 01 | 4C | 35 | 35 | 10 | 80 | 0A | 1B | 1B | 27 | 10 | 10 | 10 |
| | BATCH | 11 | 10 | 0013 | 01 | 10 | FF | 11 | 012F | 01 | 4C | 35 | 35 | 11 | 80 | 0A | 1B | 1B | 27 | 11 | 11 | 11 |
| | BATCH | 12 | 10 | 0013 | 01 | 10 | FF | 12 | 012F | 01 | 4C | 35 | 35 | 12 | 80 | 0A | 1B | 1B | 27 | 12 | 12 | 12 |
| | BATCH | 13 | 10 | 0013 | 01 | 10 | FF | 13 | 012F | 00 | 4C | 35 | 35 | 13 | 80 | 0A | 1B | 1B | 27 | 13 | 13 | 13 |
| | LOGON | 14 | 03 | 0026 | 02 | 20 | FF | 14 | 0000 | 00 | 14 | 14 | 14 | 14 | 00 | 0A | 1D | 1D | 21 | 14 | 14 | 14 |
| | LOGOFF | 15 | 04 | 0026 | 02 | 20 | FF | 15 | 0000 | 00 | 15 | 15 | 15 | 15 | 80 | 0A | 1E | 1E | 20 | 15 | 15 | 15 |
| HOLDING INTERLOCK SET | SYSOPERO | 16 | 00 | 0013 | 01 | 20 | FF | 16 | 012F | 00 | 00 | 00 | 16 | 00 | 00 | 0A | 16 | 16 | 23 | 00 | 00 | 00 |
| | INTERACTIVE | 17 | 02 | 0013 | 01 | 10 | FF | 17 | 012F | 00 | 47 | 28 | 17 | 08 | 00 | 0A | 17 | 17 | 24 | 1F | 1F | 1F |
| | INTERACTIVE | 18 | 02 | 0013 | 01 | 20 | FF | 18 | 012F | 00 | 48 | 29 | 18 | 08 | 00 | 0A | 18 | 18 | 25 | 1F | 1F | 1F |
| | INTERACTIVE | 19 | 03 | 0013 | 01 | 30 | FF | 19 | 012F | 00 | 4A | 2C | 19 | 08 | 00 | 0A | 19 | 19 | 26 | 1F | 1F | 1F |
| | BULK I/O | 1A | 03 | 0013 | 01 | 20 | FF | 1A | 012F | 00 | 0A | 0A | 1A | 0A | 00 | 0A | 1A | 1A | 22 | 1A | 1A | 1A |
| | BATCH | 1B | 04 | 0013 | 01 | 10 | FF | 1B | 012F | 00 | 4C | 35 | 18 | 08 | 00 | 0A | 1B | 1B | 27 | 1B | 1B | 1B |
| | BATCH | 1C | 04 | 0013 | 01 | 30 | FF | 1C | 012F | 00 | 35 | 36 | 1C | 13 | 00 | 0A | 1C | 1C | 28 | 1C | 1C | 1C |
| | LOGON | 1D | 01 | 0013 | 01 | 20 | FF | 1D | 012F | 00 | 14 | 14 | 10 | 14 | 00 | 0A | 1D | 1D | 21 | 14 | 14 | 14 |
| | LOGOFF | 1E | 03 | 0013 | 01 | 20 | FF | 1E | 012F | 00 | 15 | 15 | 1E | 15 | 00 | 0A | 1E | 1E | 20 | 15 | 15 | 15 |
| PREJUDICE | WRITE | 1F | 01 | 0013 | 01 | 23 | FF | 1F | 0000 | 00 | 1F | 1F | 08 | 08 | 00 | 0A | 17 | 17 | 24 | 1F | 1F | 1F |
| WAITING FOR INTERLOCK SET | LOGOFF | 20 | 06 | 0013 | 01 | 20 | FF | 20 | 0000 | 23 | 15 | 15 | 15 | 15 | 80 | 0A | 1E | 1E | 20 | 15 | 15 | 15 |
| | LOGON | 21 | 06 | 0013 | 01 | 20 | FF | 21 | 0000 | 23 | 14 | 14 | 14 | 14 | 80 | 0A | 1D | 1D | 21 | 14 | 14 | 14 |
| | BULK I/O | 22 | 06 | 0013 | 01 | 20 | FF | 22 | 0000 | 23 | 0A | 0A | 0A | 0A | 80 | 0A | 1A | 1A | 22 | 0A | 0A | 0A |
| | SYSOPERO | 23 | 06 | 0013 | 01 | 20 | FF | 23 | 0000 | 07 | 00 | 00 | 00 | 00 | 80 | 0A | 16 | 16 | 23 | 00 | 00 | 00 |
| | INTERACTIVE | 24 | 06 | 0013 | 01 | 10 | FF | 24 | 0000 | 23 | 47 | 28 | 30 | 08 | 00 | 0A | 17 | 17 | 24 | 1F | 1F | 1F |
| | INTERACTIVE | 25 | 06 | 0013 | 01 | 20 | FF | 25 | 0000 | 23 | 47 | 28 | 30 | 08 | 80 | 0A | 18 | 18 | 25 | 1F | 1F | 1F |
| | INTERACTIVE | 26 | 06 | 0013 | 01 | 30 | FF | 26 | 0000 | 23 | 28 | 20 | 3F | 08 | 80 | 0A | 19 | 19 | 26 | 1F | 1F | 1F |
| | BATCH | 27 | 06 | 0013 | 01 | 10 | FF | 27 | 012F | 23 | 33 | 35 | 27 | 0B | 80 | 0A | 1B | 1B | 27 | 0B | 0B | 0B |
| | BATCH | 28 | 06 | 0013 | 01 | 30 | FF | 28 | 012F | 23 | 33 | 35 | 28 | 13 | 80 | 0A | 1C | 1C | 28 | 13 | 13 | 13 |

A schedule table in a programming system for controlling the selection of a task and the execution of the task is provided. The table comprises a plurality of fields. Each of the fields is provided with parameters to enable the above-mentioned control. These parameters are chosen to implement the principles of "working set size" and "balanced core time." A first set of parameters, termed the "Starting Set," are employed to handle new inputs from the terminal. The Starting Set functions to control responsiveness by yielding control to new inputs, controlling task growth in real memory by folding, and sorting long running tasks by working set size. A second set of parameters, termed the "Looping Set," controls system efficiency and throughput by using balanced core time to favor efficient programs, estimating the working set time at each time slice, and delaying long running tasks to improve responsiveness. Third, fourth, and fifth sets of parameters termed the "Await," "Holding," and "Waiting-for-Interlock" sets control special programs and special conditions such as interlock handling for all programs.

METHOD OF SCHEDULING IN A DATA PROCESSING SYSTEM

Original Filed Oct. 23, 1970 18 Sheets-Sheet 1

INTERNAL SCHEDULER

INVENTOR
WALTER J. DOHERTY

BY Isidore Match
ATTORNEY

DISPATCHER

METHOD OF SCHEDULING IN A DATA PROCESSING SYSTEM

Original Filed Oct. 23, 1970 18 Sheets-Sheet 5

TASK INTERRUPT CONTROL

ENTRANCE CRITERIA

RESCHEDULING

Figures 5, 5A:
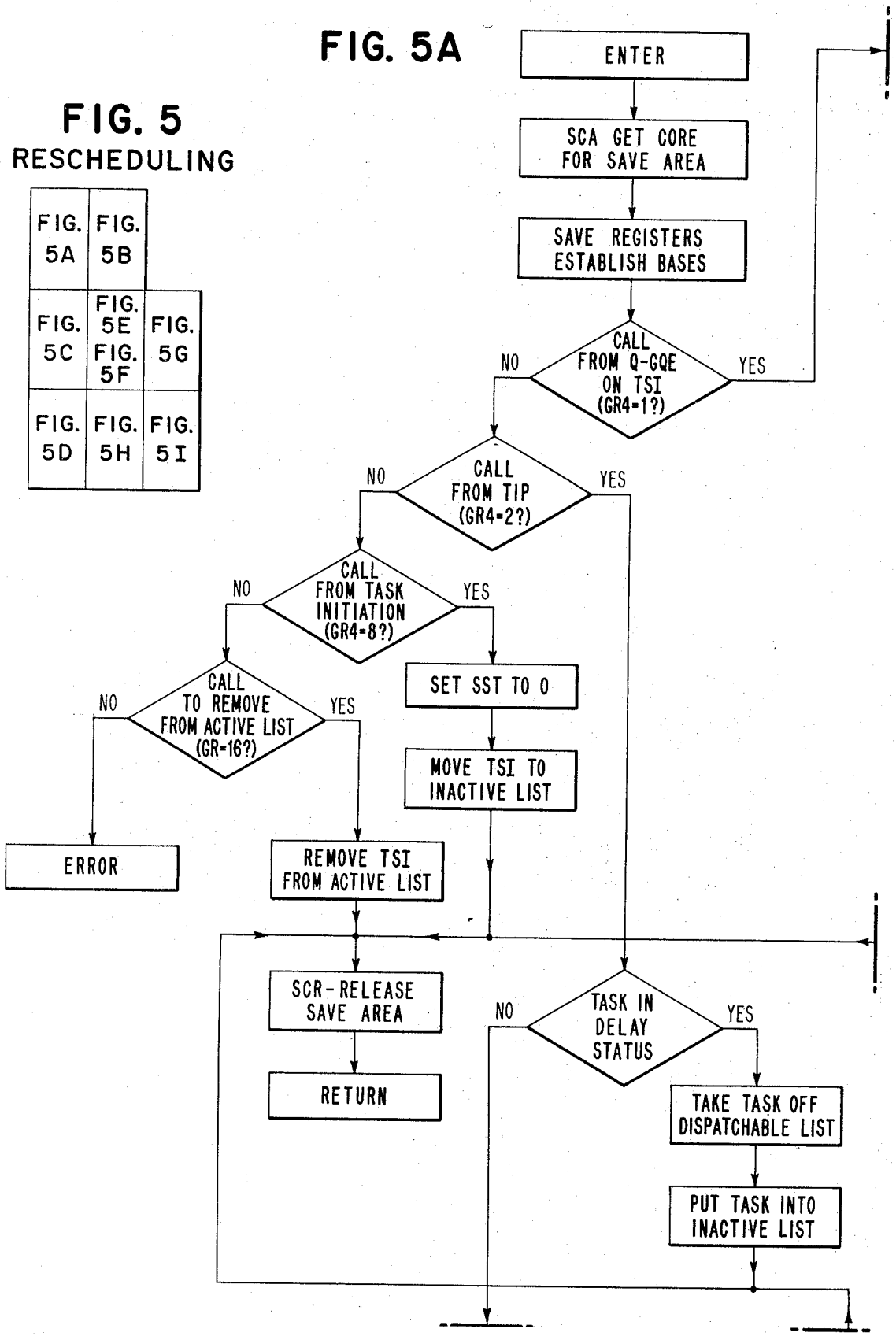
Figure 5B:
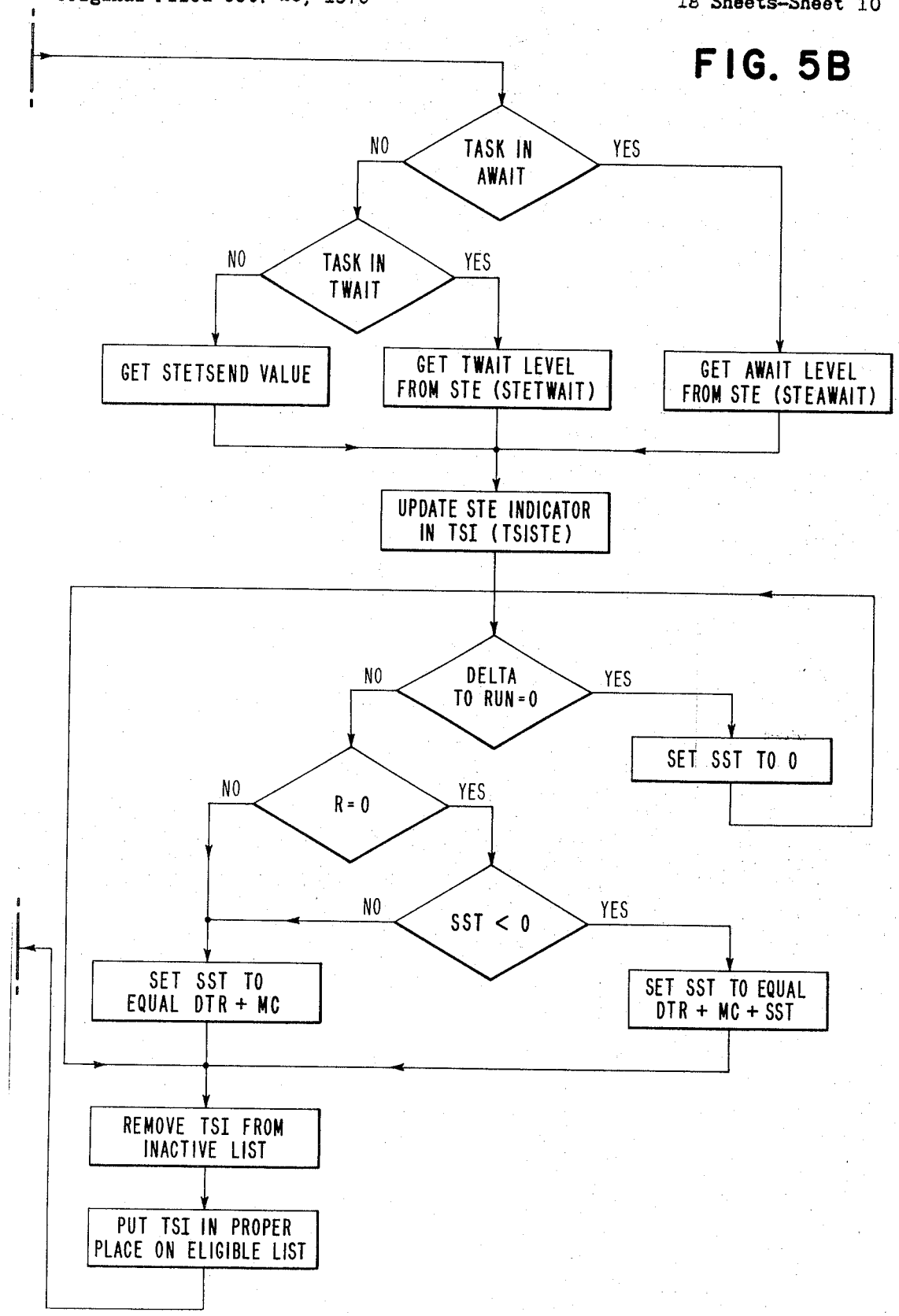
Figure 5C:
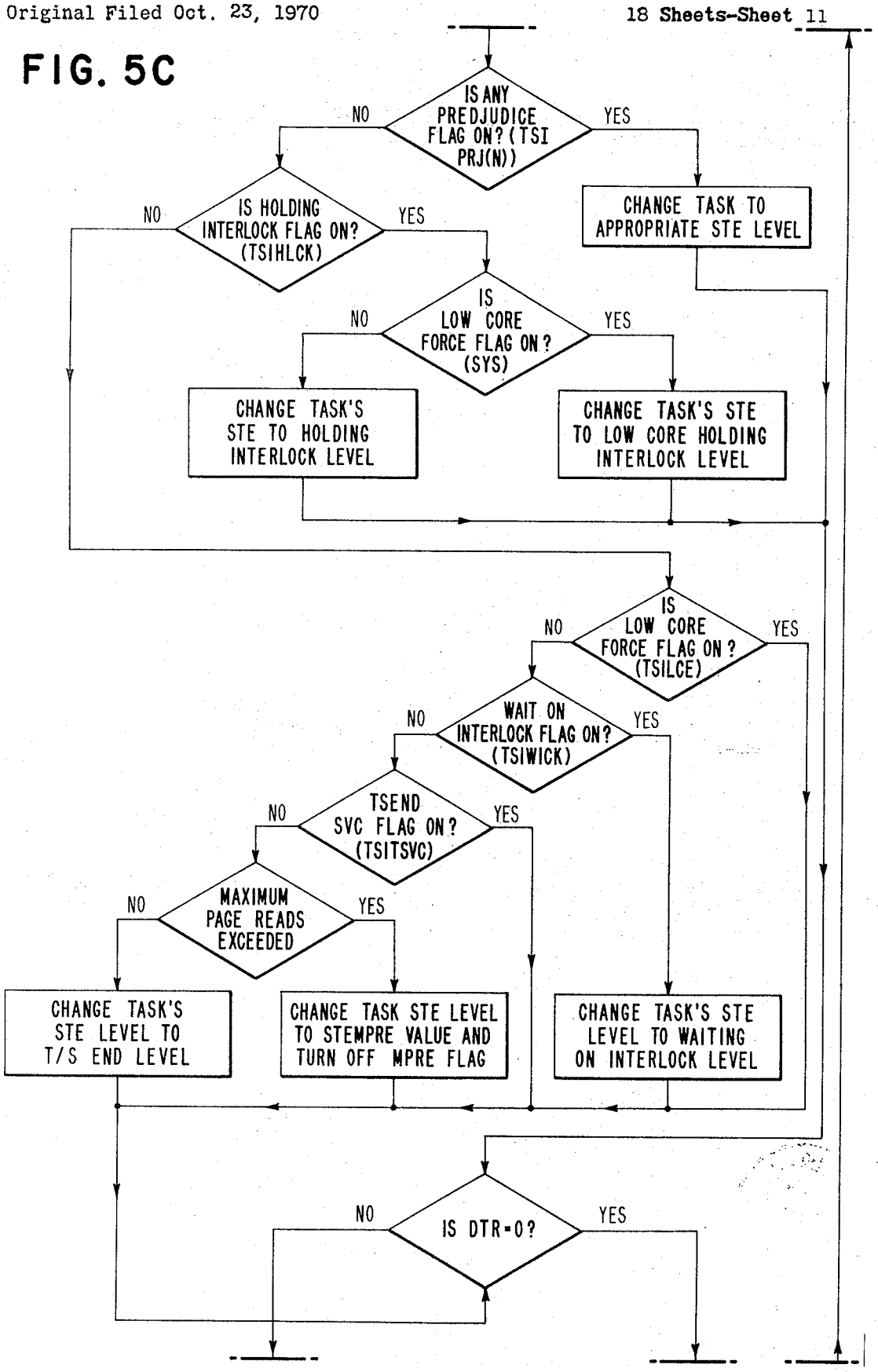
Figure 5D:
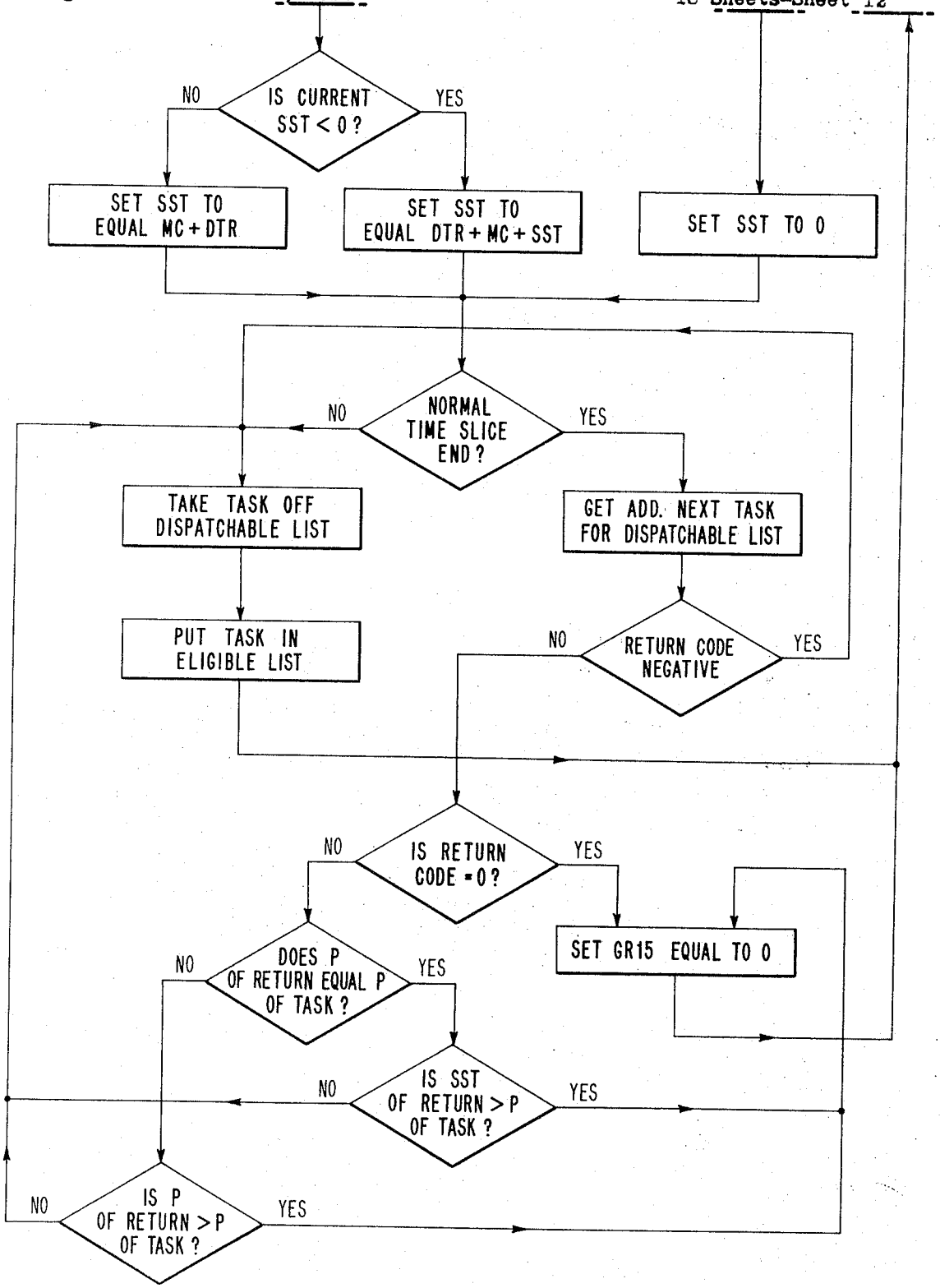
Figure 5E:
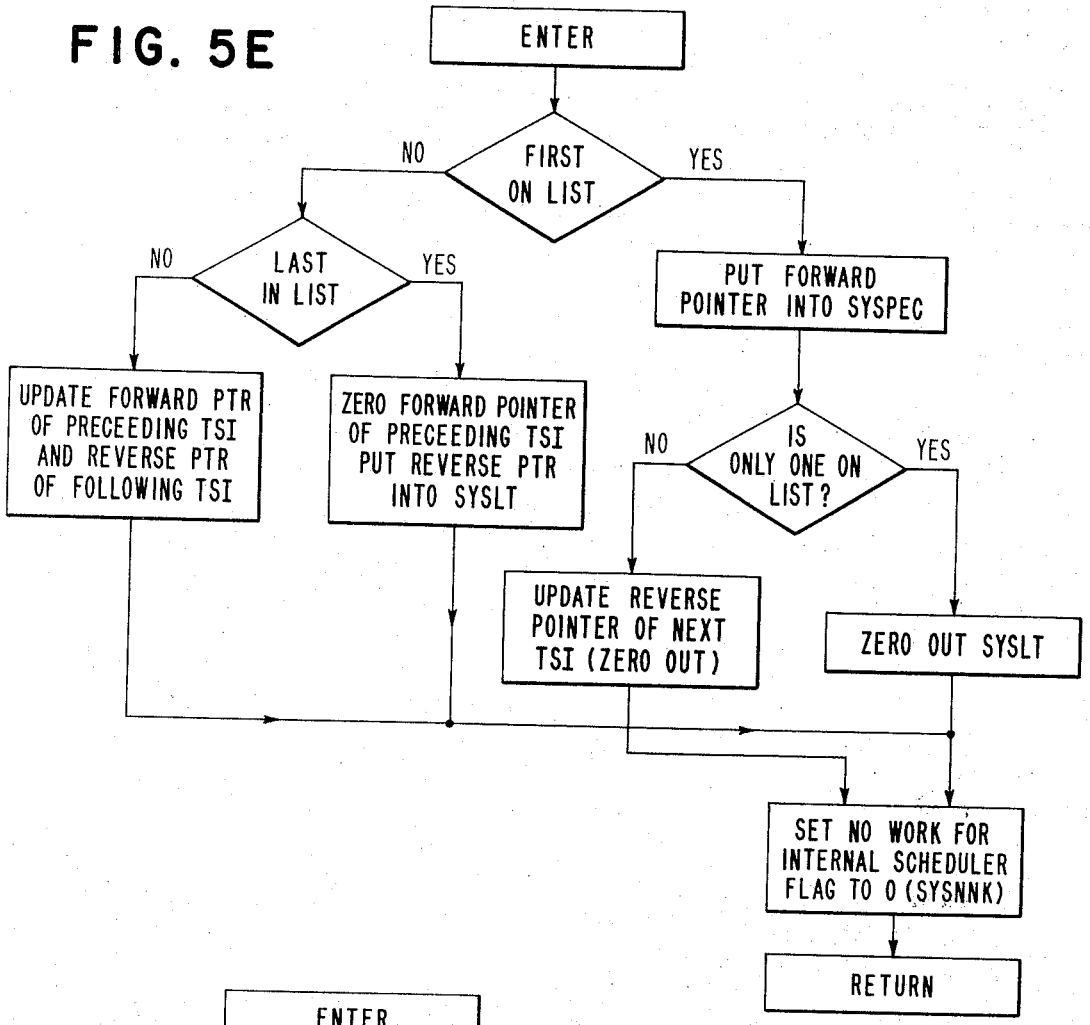
Figure 5F:
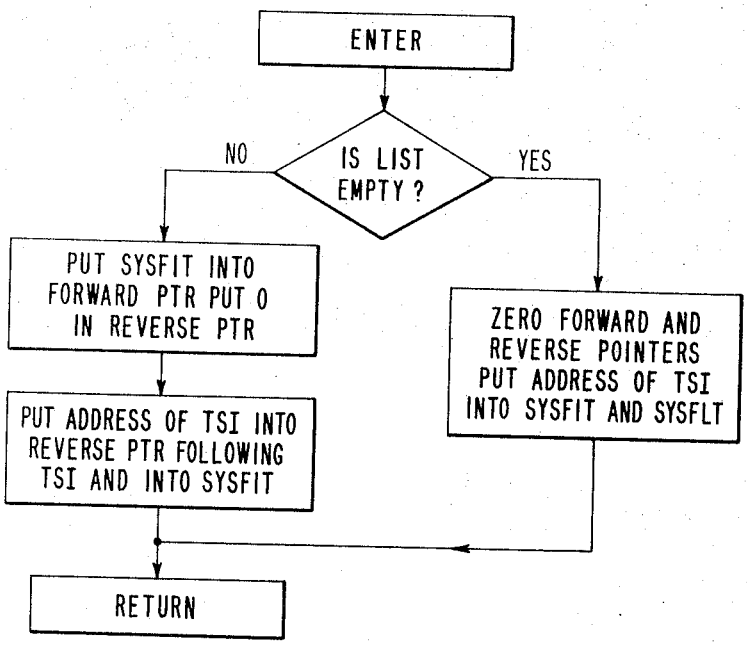
Figure 5G:
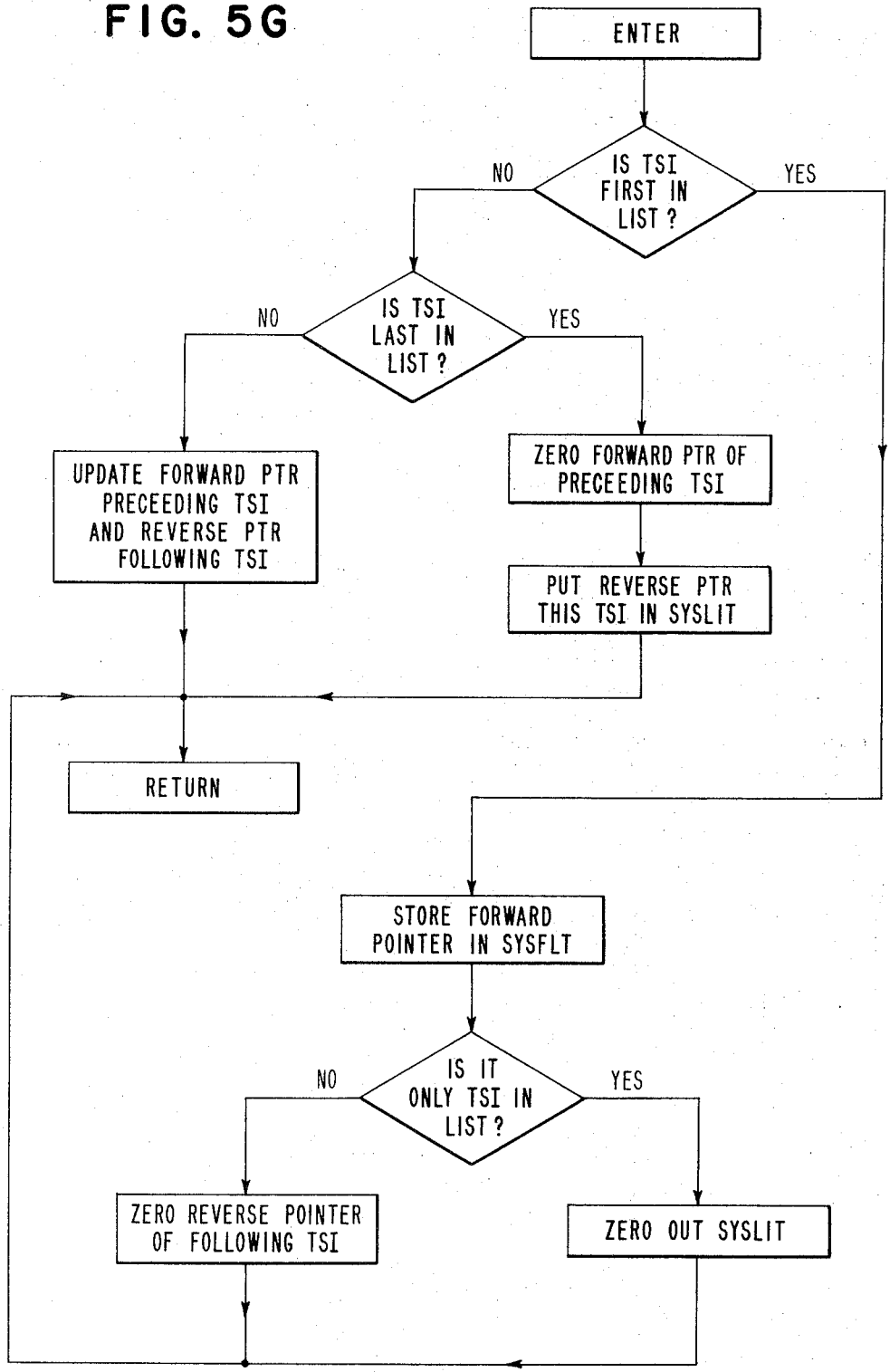
Figure 5H:
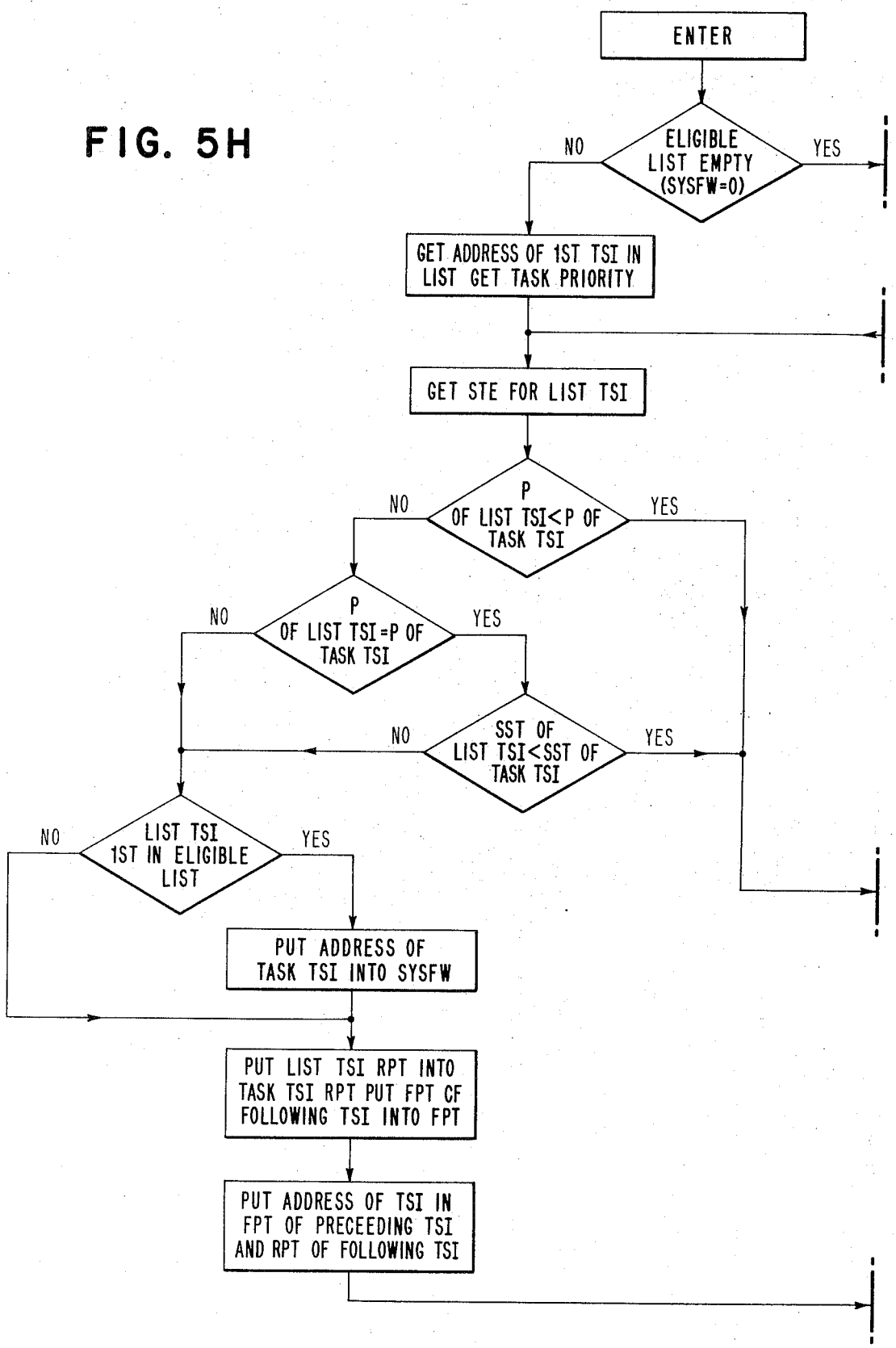
Figure 5I:
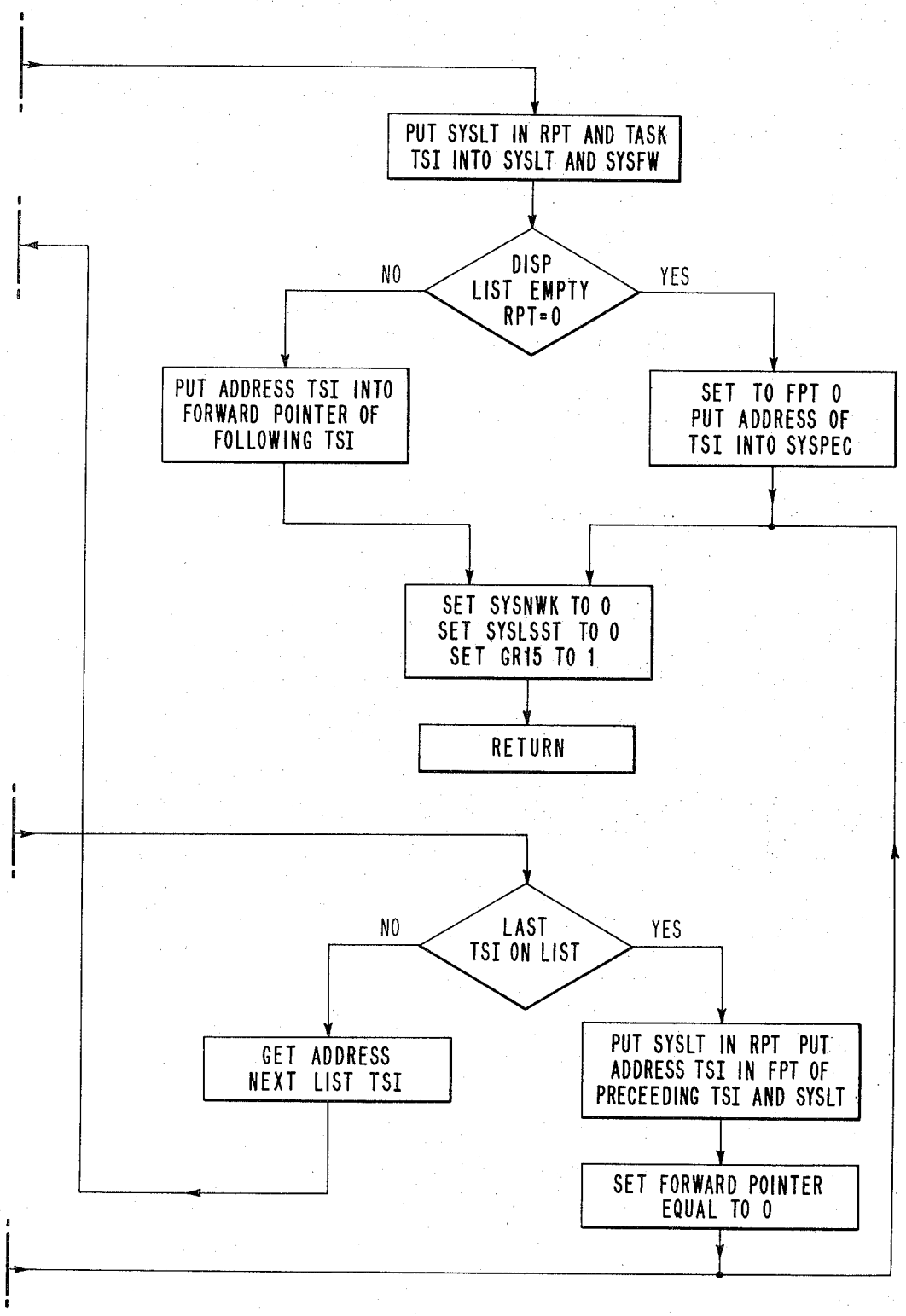

| | | |
|---|---|---|
| FIG. 5A | FIG. 5B | |
| FIG. 5C | FIG. 5E FIG. 5F | FIG. 5G |
| FIG. 5D | FIG. 5H | FIG. 5I |

FIG. 6A

FIG. 6B

FIG. 6

FIG. 6A

| | | LEVEL | PRIOR | TSVAL | QUANT | MAXCR | MAXRD | PULSE | AWTEX | DELTA | TSEND | MPRE | TWAIT | AWAIT | RCMPT | PRMPT | MRQ | HLCK | LCHL | WLCK | PRJ1 | PRJ2 | PRJ3 | PRJ4 |
|---|---|---|---|---|---|---|---|---|---|---|---|---|---|---|---|---|---|---|---|---|---|---|---|---|
| STARTING SET | SYSOPERO | 00 | 05 | 0026 | 01 | 20 | FF | 00 | 0000 | 00 | 00 | 00 | 00 | 00 | 00 | 0A | 16 | 16 | 23 | 00 | 00 | 00 | 00 |
| | INTERACTIVE | 01 | 18 | 0010 | 01 | 10 | FF | 01 | 0000 | 00 | 47 | 51 | 3D | 08 | 80 | 0A | 17 | 17 | 24 | 1F | 1F | 1F | 1F |
| | INTERACTIVE | 02 | 18 | 0010 | 01 | 10 | FF | 02 | 0000 | 00 | 47 | 51 | 3D | 08 | 80 | 0A | 17 | 17 | 24 | 1F | 1F | 1F | 1F |
| | INTERACTIVE | 03 | 18 | 0010 | 01 | 10 | FF | 03 | 0000 | 00 | 47 | 51 | 3D | 08 | 80 | 0A | 17 | 17 | 24 | 1F | 1F | 1F | 1F |
| | INTERACTIVE | 04 | 18 | 0010 | 01 | 10 | FF | 04 | 0000 | 00 | 47 | 51 | 3D | 08 | 80 | 0A | 17 | 17 | 24 | 1F | 1F | 1F | 1F |
| | INTERACTIVE | 05 | 18 | 0010 | 01 | 10 | FF | 05 | 0000 | 00 | 47 | 51 | 3D | 08 | 80 | 0A | 17 | 17 | 24 | 1F | 1F | 1F | 1F |
| | INTERACTIVE | 06 | 18 | 0010 | 01 | 10 | FF | 06 | 0000 | 00 | 47 | 51 | 3D | 08 | 80 | 0A | 17 | 17 | 24 | 1F | 1F | 1F | 1F |
| | INTERACTIVE | 07 | 18 | 0010 | 01 | 10 | FF | 07 | 0000 | 00 | 47 | 51 | 3D | 08 | 80 | 0A | 17 | 17 | 24 | 1F | 1F | 1F | 1F |
| | INTERACTIVE | 08 | 18 | 0010 | 01 | 10 | FF | 08 | 0000 | 00 | 47 | 51 | 3D | 08 | 80 | 0A | 17 | 17 | 24 | 1F | 1F | 1F | 1F |
| | INTERACTIVE | 09 | 18 | 0010 | 01 | 10 | FF | 09 | 0000 | 00 | 47 | 51 | 3D | 08 | 80 | 0A | 17 | 17 | 24 | 1F | 1F | 1F | 1F |
| | BULK I/O | 0A | 04 | 0026 | 01 | 20 | FF | 0A | 0000 | 00 | 0A | 0A | 0A | 0A | 00 | 01 | 1A | 1A | 22 | 0A | 0A | 0A | 0A |
| | BATCH | 0B | 1D | 0013 | 01 | 10 | FF | 0B | 012F | 01 | 4C | 35 | 35 | 0B | 80 | 0A | 1B | 1B | 27 | 0B | 0B | 0B | 0B |
| | BATCH | 0C | 1D | 0013 | 01 | 10 | FF | 0C | 012F | 01 | 4C | 35 | 35 | 0C | 80 | 0A | 1B | 1B | 27 | 0C | 0C | 0C | 0C |
| | BATCH | 0D | 1D | 0013 | 01 | 10 | FF | 0D | 012F | 01 | 4C | 35 | 35 | 0D | 80 | 0A | 1B | 1B | 27 | 0D | 0D | 0D | 0D |
| | BATCH | 0E | 1D | 0013 | 01 | 10 | FF | 0E | 012F | 01 | 4C | 35 | 35 | 0E | 80 | 0A | 1B | 1B | 27 | 0E | 0E | 0E | 0E |
| | BATCH | 0F | 1D | 0013 | 01 | 10 | FF | 0F | 012F | 01 | 4C | 35 | 35 | 0F | 80 | 0A | 1B | 1B | 27 | 0F | 0F | 0F | 0F |
| | BATCH | 10 | 1D | 0013 | 01 | 10 | FF | 10 | 012F | 01 | 4C | 35 | 35 | 10 | 80 | 0A | 1B | 1B | 27 | 10 | 10 | 10 | 10 |
| | BATCH | 11 | 1D | 0013 | 01 | 10 | FF | 11 | 012F | 01 | 4C | 35 | 35 | 11 | 80 | 0A | 1B | 1B | 27 | 11 | 11 | 11 | 11 |
| | BATCH | 12 | 1D | 0013 | 01 | 10 | FF | 12 | 012F | 01 | 4C | 35 | 35 | 12 | 80 | 0A | 1B | 1B | 27 | 12 | 12 | 12 | 12 |
| | BATCH | 13 | 1D | 0013 | 01 | 10 | FF | 13 | 012F | 00 | 4C | 35 | 35 | 13 | 80 | 0A | 1B | 1B | 27 | 13 | 13 | 13 | 13 |
| | LOGON | 14 | 03 | 0026 | 02 | 20 | FF | 14 | 0000 | 00 | 14 | 14 | 14 | 14 | 00 | 0A | 1D | 1D | 21 | 14 | 14 | 14 | 14 |
| | LOGOFF | 15 | 04 | 0026 | 02 | 20 | FF | 15 | 0000 | 00 | 15 | 15 | 15 | 15 | 80 | 0A | 1E | 1E | 20 | 15 | 15 | 15 | 15 |
| HOLDING INTERLOCK SET | SYSOPERO | 16 | 00 | 0013 | 01 | 20 | FF | 16 | 012F | 00 | 00 | 00 | 16 | 00 | 00 | 0A | 16 | 16 | 23 | 00 | 00 | 00 | 00 |
| | INTERACTIVE | 17 | 02 | 0013 | 01 | 10 | FF | 17 | 012F | 00 | 47 | 2B | 17 | 08 | 00 | 0A | 17 | 17 | 24 | 1F | 1F | 1F | 1F |
| | INTERACTIVE | 18 | 02 | 0013 | 01 | 20 | FF | 18 | 012F | 00 | 4B | 2B | 18 | 08 | 00 | 0A | 18 | 18 | 25 | 1F | 1F | 1F | 1F |
| | INTERACTIVE | 19 | 03 | 0013 | 01 | 30 | FF | 19 | 012F | 00 | 4A | 2C | 19 | 08 | 00 | 0A | 19 | 19 | 26 | 1F | 1F | 1F | 1F |
| | BULK I/O | 1A | 03 | 0013 | 01 | 20 | FF | 1A | 012F | 00 | 0A | 0A | 1A | 0A | 00 | 0A | 1A | 1A | 22 | 1A | 1A | 1A | 1A |
| | BATCH | 1B | 04 | 0013 | 01 | 10 | FF | 1B | 012F | 00 | 4C | 35 | 1B | 0B | 00 | 0A | 1B | 1B | 27 | 1B | 1B | 1B | 1B |
| | BATCH | 1C | 04 | 0013 | 01 | 30 | FF | 1C | 012F | 00 | 35 | 36 | 1C | 13 | 00 | 0A | 1C | 1C | 28 | 1C | 1C | 1C | 1C |
| | LOGON | 1D | 01 | 0013 | 01 | 20 | FF | 1D | 012F | 00 | 14 | 14 | 1D | 14 | 00 | 0A | 1D | 1D | 21 | 14 | 14 | 14 | 14 |
| | LOGOFF | 1E | 03 | 0013 | 01 | 20 | FF | 1E | 012F | 00 | 15 | 15 | 1E | 15 | 00 | 0A | 1E | 1E | 20 | 15 | 15 | 15 | 15 |
| PREJUDICE | WRITE | 1F | 01 | 0013 | 01 | 23 | FF | 1F | 0000 | 00 | 1F | 1F | 08 | 08 | 00 | 0A | 17 | 17 | 24 | 1F | 1F | 1F | 1F |
| WAITING FOR INTERLOCK SET | LOGOFF | 20 | 06 | 0013 | 01 | 20 | FF | 20 | 0000 | 23 | 15 | 15 | 15 | 15 | 80 | 0A | 1E | 1E | 20 | 15 | 15 | 15 | 15 |
| | LOGON | 21 | 06 | 0013 | 01 | 20 | FF | 21 | 0000 | 23 | 14 | 14 | 14 | 14 | 80 | 0A | 1D | 1D | 21 | 14 | 14 | 14 | 14 |
| | BULK I/O | 22 | 06 | 0013 | 01 | 20 | FF | 22 | 0000 | 23 | 0A | 0A | 0A | 0A | 80 | 0A | 1A | 1A | 22 | 0A | 0A | 0A | 0A |
| | SYSOPERO | 23 | 06 | 0013 | 01 | 20 | FF | 23 | 0000 | 07 | 00 | 00 | 00 | 00 | 80 | 0A | 16 | 16 | 23 | 00 | 00 | 00 | 00 |
| | INTERACTIVE | 24 | 06 | 0013 | 01 | 10 | FF | 24 | 0000 | 23 | 47 | 2B | 3D | 08 | 00 | 0A | 17 | 17 | 24 | 1F | 1F | 1F | 1F |
| | INTERACTIVE | 25 | 06 | 0013 | 01 | 20 | FF | 25 | 0000 | 23 | 47 | 2B | 3D | 08 | 80 | 0A | 18 | 18 | 25 | 1F | 1F | 1F | 1F |
| | INTERACTIVE | 26 | 06 | 0013 | 01 | 30 | FF | 26 | 0000 | 23 | 2B | 2D | 3F | 08 | 80 | 0A | 19 | 19 | 26 | 1F | 1F | 1F | 1F |
| | BATCH | 27 | 06 | 0013 | 01 | 10 | FF | 27 | 012F | 23 | 33 | 35 | 27 | 0B | 80 | 0A | 1B | 1B | 27 | 0B | 0B | 0B | 0B |
| | BATCH | 28 | 06 | 0013 | 01 | 30 | FF | 28 | 012F | 23 | 33 | 35 | 28 | 13 | 80 | 0A | 1C | 1C | 28 | 13 | 13 | 13 | 13 |

| | | | | | | | | | | | | | | | | | | | | | | | |
|---|---|---|---|---|---|---|---|---|---|---|---|---|---|---|---|---|---|---|---|---|---|---|---|
| LOOPING INTERACTIVE SET | GROWING | 29 | 08 | 0026 | 08 | 10 | FF | 29 | 0000 | 00 | 2A | 2B | 3D | 08 | 00 | 0A | 17 | 17 | 24 | 1F | 1F | 1F | 1F |
| | DELAYING | 2A | 08 | 0026 | 08 | 18 | FF | 2A | 0000 | 23 | 47 | 29 | 3D | 08 | 80 | 0A | 18 | 18 | 25 | 1F | 1F | 1F | 1F |
| | GROWING | 2B | 18 | 0026 | 02 | 20 | FF | 2B | 0000 | 00 | 2A | 2C | 3F | 08 | 00 | 0A | 18 | 18 | 25 | 1F | 1F | 1F | 1F |
| | GROWING | 2C | 17 | 0026 | 02 | 30 | FF | 2C | 0000 | 00 | 2F | 2D | 40 | 08 | 00 | 0A | 19 | 19 | 26 | 1F | 1F | 1F | 1F |
| | GROWING | 2D | 16 | 0013 | 01 | 40 | FF | 2D | 0000 | 00 | 30 | 2E | 41 | 08 | 00 | 0A | 19 | 19 | 26 | 1F | 1F | 1F | 1F |
| | GROWING | 2E | 15 | 0013 | 01 | 40 | FF | 2E | 0000 | 00 | 31 | 32 | 42 | 08 | 00 | 0A | 19 | 19 | 26 | 1F | 1F | 1F | 1F |
| | DELAYING | 2F | 14 | 0026 | 02 | 20 | FF | 2F | 0000 | 23 | 4B | 2B | 3F | 08 | 80 | 0A | 19 | 19 | 26 | 1F | 1F | 1F | 1F |
| | DELAYING | 30 | 14 | 0026 | 01 | 30 | FF | 30 | 0000 | 23 | 4A | 2C | 40 | 08 | 80 | 0A | 19 | 19 | 26 | 1F | 1F | 1F | 1F |
| | DELAYING | 31 | 14 | 0026 | 01 | 40 | FF | 31 | 0000 | 23 | 49 | 2D | 41 | 08 | 80 | 0A | 19 | 19 | 26 | 1F | 1F | 1F | 1F |
| | DELAYING | 32 | 14 | 0013 | 01 | 40 | FF | 32 | 0000 | 23 | 49 | 2D | 42 | 08 | 80 | 0A | 19 | 19 | 26 | 1F | 1F | 1F | 1F |
| LOOPING BATCH SET | GROWING | 33 | 13 | 0026 | 08 | 10 | FF | 33 | 012F | 00 | 34 | 35 | 34 | 34 | 00 | 0A | 1B | 1B | 27 | 34 | 34 | 34 | 34 |
| | DELAYING | 34 | 11 | 0026 | 08 | 18 | FF | 34 | 012F | 23 | 4C | 33 | 33 | 34 | 80 | 0A | 1B | 1B | 27 | 34 | 34 | 34 | 34 |
| | GROWING | 35 | 1C | 0026 | 02 | 20 | FF | 35 | 012F | 00 | 33 | 36 | 39 | 39 | 00 | 0A | 1B | 1B | 27 | 39 | 39 | 39 | 39 |
| | GROWING | 36 | 1B | 0026 | 02 | 30 | FF | 36 | 012F | 00 | 39 | 37 | 3A | 3A | 00 | 0A | 1C | 1C | 28 | 3A | 3A | 3A | 3A |
| | GROWING | 37 | 1A | 0013 | 01 | 40 | FF | 37 | 012F | 00 | 3A | 38 | 3B | 3B | 00 | 0A | 1C | 1C | 28 | 3B | 3B | 3B | 3B |
| | GROWING | 38 | 19 | 0013 | 01 | 40 | FF | 38 | 012F | 00 | 3B | 3C | 3C | 3C | 00 | 0A | 1C | 1C | 28 | 3C | 3C | 3C | 3C |
| | DELAYING | 39 | 1A | 0026 | 02 | 20 | FF | 39 | 012F | 23 | 50 | 35 | 35 | 39 | 80 | 0A | 1C | 1C | 28 | 39 | 39 | 39 | 39 |
| | DELAYING | 3A | 1A | 0026 | 01 | 30 | FF | 3A | 012F | 23 | 4F | 36 | 36 | 3A | 00 | 0A | 1C | 1C | 28 | 3A | 3A | 3A | 3A |
| | DELAYING | 3B | 1A | 0013 | 01 | 40 | FF | 3B | 012F | 23 | 4E | 37 | 37 | 3B | 80 | 0A | 1C | 1C | 28 | 3B | 3B | 3B | 3B |
| | DELAYING | 3C | 1A | 0013 | 01 | 40 | FF | 3C | 012F | 23 | 4E | 37 | 38 | 3C | 80 | 0A | 1C | 1C | 28 | 3C | 3C | 3C | 3C |
| AWAIT INTERACTIVE SET | GROWING | 3D | 0B | 0026 | 01 | 10 | FF | 3D | 012F | 00 | 2A | 2B | 3E | 08 | 00 | 0A | 17 | 17 | 24 | 1F | 1F | 1F | 1F |
| | DELAYING | 3E | 0B | 0026 | 01 | 10 | FF | 3E | 012F | 23 | 47 | 2B | 3D | 08 | 80 | 0A | 17 | 17 | 24 | 1F | 1F | 1F | 1F |
| | GROWING | 3F | 18 | 0013 | 01 | 20 | FF | 3F | 012F | 00 | 2A | 2C | 43 | 08 | 00 | 0A | 18 | 18 | 25 | 1F | 1F | 1F | 1F |
| | GROWING | 40 | 17 | 0010 | 01 | 30 | FF | 40 | 012F | 00 | 2F | 2D | 44 | 08 | 00 | 0A | 19 | 19 | 26 | 1F | 1F | 1F | 1F |
| | GROWING | 41 | 16 | 0004 | 01 | 40 | FF | 41 | 012F | 00 | 30 | 2E | 45 | 08 | 00 | 0A | 19 | 19 | 26 | 1F | 1F | 1F | 1F |
| | GROWING | 42 | 15 | 0004 | 01 | 40 | FF | 42 | 012F | 00 | 31 | 32 | 46 | 08 | 00 | 0A | 19 | 19 | 26 | 1F | 1F | 1F | 1F |
| | DELAYING | 43 | 14 | 0013 | 01 | 20 | FF | 43 | 012F | 23 | 29 | 2C | 3F | 08 | 80 | 0A | 18 | 18 | 25 | 1F | 1F | 1F | 1F |
| | DELAYING | 44 | 14 | 0010 | 01 | 30 | FF | 44 | 012F | 23 | 2B | 2D | 40 | 08 | 80 | 0A | 19 | 19 | 26 | 1F | 1F | 1F | 1F |
| | DELAYING | 45 | 14 | 0004 | 01 | 40 | FF | 45 | 012F | 23 | 2C | 2E | 41 | 08 | 80 | 0A | 19 | 19 | 26 | 1F | 1F | 1F | 1F |
| | DELAYING | 46 | 14 | 0004 | 01 | 40 | FF | 46 | 012F | 23 | 2D | 2E | 42 | 08 | 80 | 0A | 19 | 19 | 26 | 1F | 1F | 1F | 1F |
| LOOPING INTERACTIVE SET | SHRINKING | 47 | 07 | 0026 | 10 | 08 | FF | 47 | 0000 | 00 | 48 | 29 | 3D | 08 | 00 | 08 | 17 | 17 | 24 | 1F | 1F | 1F | 1F |
| | DELAYING | 48 | 07 | 0026 | 10 | 08 | FF | 48 | 0000 | 23 | 47 | 29 | 3D | 08 | 80 | 08 | 17 | 17 | 24 | 1F | 1F | 1F | 1F |
| | SHRINKING | 49 | 17 | 0026 | 01 | 30 | FF | 49 | 0000 | 00 | 4A | 2C | 40 | 08 | 00 | 0A | 19 | 19 | 26 | 1F | 1F | 1F | 1F |
| | SHRINKING | 4A | 16 | 0026 | 02 | 20 | FF | 4A | 0000 | 00 | 4B | 2B | 3F | 08 | 00 | 0A | 18 | 18 | 25 | 1F | 1F | 1F | 1F |
| | SHRINKING | 4B | 15 | 0026 | 08 | 18 | FF | 4B | 0000 | 00 | 47 | 29 | 3E | 08 | 00 | 0A | 18 | 18 | 25 | 1F | 1F | 1F | 1F |
| LOOPING BATCH SET | SHRINKING | 4C | 13 | 0026 | 10 | 08 | FF | 4C | 012F | 00 | 4D | 33 | 4D | 4D | 00 | 08 | 1B | 1B | 27 | 4D | 4D | 4D | 4D |
| | DELAYING | 4D | 11 | 0026 | 10 | 08 | FF | 4D | 012F | 23 | 4C | 33 | 4C | 4D | 80 | 08 | 1B | 1B | 27 | 4D | 4D | 4D | 4D |
| | SHRINKING | 4E | 1B | 0026 | 01 | 30 | FF | 4E | 012F | 00 | 4F | 37 | 3A | 3A | 00 | 0A | 1C | 1C | 28 | 4E | 4E | 4E | 4E |
| | SHRINKING | 4F | 1A | 0026 | 02 | 20 | FF | 4F | 012F | 00 | 50 | 36 | 39 | 39 | 00 | 0A | 1C | 1B | 27 | 4F | 4F | 4F | 4F |
| | SHRINKING | 50 | 19 | 0026 | 08 | 18 | FF | 50 | 012F | 00 | 4C | 35 | 34 | 34 | 00 | 0A | 1B | 1B | 27 | 50 | 50 | 50 | 50 |
| STARTING SET | INTERACTIVE | 51 | 17 | 0008 | 01 | 20 | FF | 51 | 0000 | 00 | 2B | 52 | 3F | 08 | 00 | 0A | 18 | 18 | 25 | 1F | 1F | 1F | 1F |
| | INTERACTIVE | 52 | 16 | 0006 | 01 | 30 | FF | 52 | 0000 | 00 | 2C | 53 | 40 | 08 | 00 | 0A | 19 | 19 | 26 | 1F | 1F | 1F | 1F |
| | INTERACTIVE | 53 | 15 | 0004 | 01 | 40 | FF | 53 | 0000 | 00 | 2C | 2D | 40 | 08 | 00 | 0A | 19 | 19 | 26 | 1F | 1F | 1F | 1F |

FIG. 6B